Nov. 22, 1960

S. C. ROCKAFELLOW 2,961,596

APPARATUS FOR AUTOMATIC POWER FACTOR COMPENSATION FOR TUBE FIRING RESISTANCE WELDING CONTROL

Filed April 28, 1958

INVENTOR.
STUART C. ROCKAFELLOW

BY
*Woodhams Blanchard & Flynn*

ATTORNEYS

United States Patent Office 2,961,596
Patented Nov. 22, 1960

2,961,596

APPARATUS FOR AUTOMATIC POWER FACTOR COMPENSATION FOR TUBE FIRING RESISTANCE WELDING CONTROL

Stuart C. Rockafellow, Plymouth, Mich., assignor to Robotron Corporation, Detroit, Mich., a corporation of Michigan Filed Apr. 28, 1958, Ser. No. 731,295

7 Claims. (Cl. 323—58)

This invention relates to a circuit for controlling current flow and it relates particularly to a circuit for automatically adjusting the initiation of current flow in another circuit to compensate for the power factor characteristics of the latter circuit.

It will be recognized as the description proceeds that the invention can be utilized in a wide variety of circuits wherein current is caused to flow in a series of pulses, either alternating or uni-directional. However, a particular problem which gave rise to the present invention developed in connection with initiating welding current flow in a resistance welding system and, accordingly, the following discussion will refer primarily to such specific problem. It will be understood that this illustrates only one specific use of the invention and is in no sense to be taken as limiting.

Turning now to the particular problem which gave rise to the present invention, it is well-known that a conventional welding control circuit utilizes a pair of back-to-back connected ignitrons connected to the primary winding of a welding transformer. Conduction of each of the ignitrons is controlled by a firing circuit and each firing circuit normally uses a thyratron as its valve unit. This type of circuit has been standard for many years and has been well accepted by the welding industry.

It is also well-known that the power factor angle of a welder often varies widely from job to job and sometimes under specific circumstances will vary rather materially from time-to-time in a single welding job. It is well understood, therefore, that the firing time of the thyratrons should be closely adjusted with respect to the power factor angle in order to cause said firing time to occur as closely as possible to, but not appreciably before, the time at which the current crosses the zero axis of the time current diagram. Where the power factor of the welder is reasonably steady this presents no great problem and an adjustment can be made which will cause the apparatus to work satisfactorily. However, where the power factor changes from time-to-time, and particularly where the power factor changes in a course of a single welding operation, it becomes at best extremely difficult, and often impossible, to adjust the firing point of the thyratrons properly with respect to the power factor. The result is, then, that the power factor adjustment is not made and either the thyratrons are caused to be fired an appreciable period after the weld current reaches zero which wastes an available portion of the line voltage cycle or the thyratrons are fired too soon and permits short circuiting of the ignitrons. Where this last mentioned possibility occurs, the ignitrons burn out much sooner than they would otherwise and their replacement creates a substantial maintenance problem, both from the standpoint of lost production while the ignitrons are being replaced and from the standpoint of the direct cost of replacement itself.

Accordingly, it has long been desired to provide a circuit by which the firing point of the thyratrons can be automatically varied in response to variations of the power factor of the welder so that the circuit can be automatically adjusted to render the ignitrons conductive at a time extremely close to the time at which the current crosses the zero axis of the time current diagram.

Accordingly, the particular objects of the invention are:

(1) to provide a circuit for delaying the energization of a firing circuit until the current lagging the line voltage substantially reaches zero;

(2) to provide a circuit, as aforesaid, which will not render valve units conductive until the current is of the same polarity as the voltage;

(3) to provide a circuit, as aforesaid, which includes a relatively simple power factor compensating means in association with otherwise standard circuitry;

(4) to provide a circuit, as aforesaid, in which the power factor compensating means operates automatically in response to electrical values within a given circuit and hence the desired control is obtained regardless of the nature of rate of change in power factors existing at a given time;

(5) to provide a circuit, as aforesaid, in which the power factor compensating means involves no moving parts;

(6) to provide a circuit, as aforesaid, in which the control over the firing times of the valve units is based directly on the flow of current in the circuit and hence is of a high degree of accuracy and reliability; and (7) to provide a circuit, as aforesaid, in which the power factor compensating means is of extreme simplicity and hence can be provided at extremely low cost.

Other objects and purposes of the invention will be apparent to persons acquainted with circuits of this general type upon reading the following disclosure and inspection of the accompanying drawings.

Figure 1:
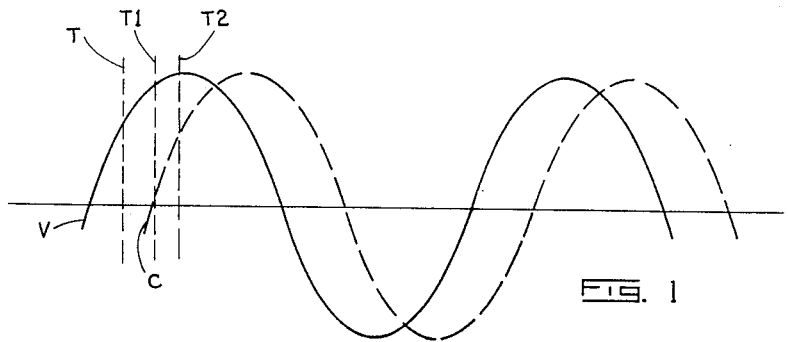
Figure 1 is a time vs. voltage current diagram of a conventional alternating current circuit for a resistance welder having a lagging power factor for illustrating the nature of the problem which this invention is intended to solve.

Figure 1 illustrates a typical operating condition for a resistance welder wherein the line V represents the A.C. line voltage applied to the circuit connected for energizing the welding transformer and the line C represents the current flow through the welding transformer in response to said voltage. If the thyratrons are fired at the point indicated by the line T then the current in the welding transformer, which is still negative at this point, will tend to short circuit through the ignitrons and burn them out. Thus, it is very important that the ignitrons are not fired at any appreciable time prior to the time indicated by the line T1 at which time the current in the weld transformer is zero. On the other hand, if the ignitrons are not fired until the point indicated by the line T2 or later, then a substantial part of the voltage cycle will be wasted and, thus, the time available for effecting a given weld will be reduced.

In general

In general, the invention provides a circuit having a current transformer connected to a conductor whose energization is controlled by electric valve means. The current transformer is connected so that current flowing in the conductor is utilized for imposing a control potential onto the control means of the electric valve means. Thus, even though the potential applied to the valve means is of such polarity and value that the valve means are capable of being rendered conductive; a lagging current flowing in the current transformer will apply a counter potential on the electric valve means to prevent same from becoming conductive until the current of opposite polarity has ceased to flow. Thus, the electric valve means will not be rendered conductive until both the voltage and the current are of the same polarity. Thus, the lagging power factor is thereby automatically taken into consideration in determining the precise point at which the valve means actually becomes conductive.

Detailed description

Figure 2:
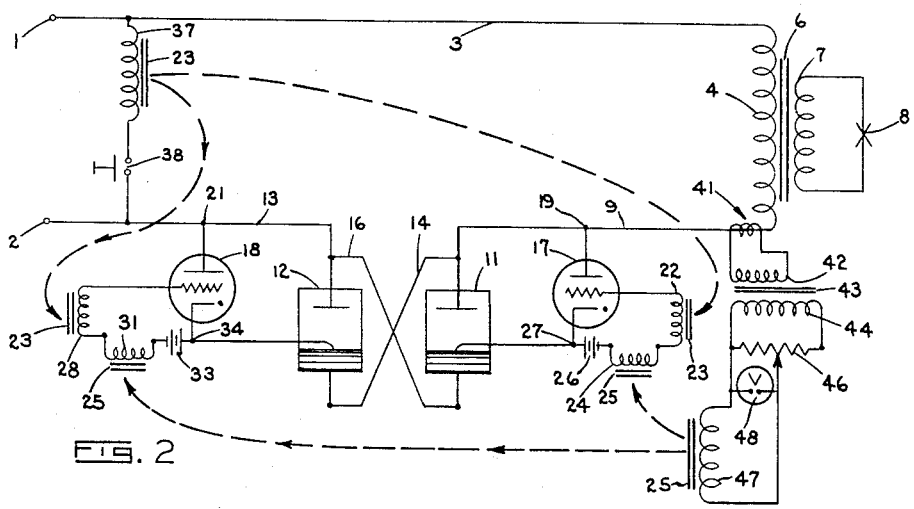
Figure 2 is a circuit diagram of a circuit for controlling a resistance welder with the circuitry of the invention applied thereto.

Turning now to Figure 2 there is shown one specific circuit by which the invention may be practiced. However, it will be understood that the specific circuitry here shown is only illustrative of the invention and may be replaced by other circuits for carrying out the method and embodying the apparatus of the invention.

Numerals 1 and 2 indicate a pair of terminals connectible in a conventional manner to a suitable source of alternating current of whatever voltage is desired. The terminal 1 is connected by conductor 3 to one end of the primary winding 4 of a welding transformer 6. The secondary winding 7 thereof is connected in any conventional manner to the welding electrodes 8. The other end of said primary winding 4 is connected by a conductor 9 through a pair of ignitrons 11 and 12 to a conductor 13 and thence to the terminal 2. The ignitrons 11 and 12 are connected in back-to-back connection in the usual manner by the conductors 14 and 16. The ignitors of the ignitrons 11 and 12 are connected, respectively, in the usual manner to the cathodes of the thyratrons 17 and 18, respectively. The anodes of thyratrons 17 and 18 are connected to the junction points 19 and 21 on the conductors 9 and 13, respectively. The control electrode of the thyratron 17 is connected through the secondary winding 22 of the transformer 23 and the secondary winding 24 of the transformer 25 to the negative side of a source of constant potential, such as a battery 26. The positive side of the source 26 is connected to the junction point 27 located between the cathode of the thyratron 17 and the ignitor of the ignitron 11. The control electrode of the thyratron 18 is connected to the secondary winding 28 of the transformer 23 and thence through the secondary winding 31 of the transformer 25 to the negative side of a source of constant potential, such as a battery 33, and the positive side of said source is connected to a junction point 34 located between the cathode of the thyratron 18 and the ignitor of the ignitron 12.

The transformer 23 has one end of its primary winding 37 connected to the conductor 3 and has its other end connected through a switch 38 to the conductor 13. The switch 38 is here shown as a manual, push-button type of switch but it will be understood that any type of switching apparatus, including another electronic circuit, may be used if desired and is included within the scope of the invention.

Thus far, excepting for the transformers 23 and 25, the circuitry above described is conventional and it may be varied widely within the scope of the invention.

Turning now to the remainder of the circuit embodying the present invention, there is provided a current transformer 41 associated with the conductor 9 and connected to the primary winding 42 of the transformer 43 for applying voltage thereto. The ends of the secondary winding 44 of the transformer 43 are connected, respectively, to the respective ends of the resistance portion of the potentiometer 46. One end of the potentiometer 46 and the slider thereof are connected to the respective ends of the primary winding 47 of the transformer 25, the secondary windings of said transformer being the windings 24 and 31 referred to hereinabove. The potentiometer 46 permits adjustment of the magnitude of the potential imposed on the winding 47 from the current transformer. If desired, a voltmeter 48 may be connected across the output terminals of the potentiometer 46.

Operation

The operation of the conventional portion of circuit above described is already well-known but will be reviewed here briefly for completeness. The ignitrons 11 and 12 act as electric valves for controlling the supply of potential to the primary winding 4 of the welding transformer 6 and the thyratrons 17 and 18 control the periods of conductivity of said ignitrons.

In the "at rest" condition, the constant potential sources 26 and 33 bias the control electrodes of the thyratrons 17 and 18, respectively, to hold said thyratrons non-conductive. So long as the thyratrons are non-conductive the ignitrons will not be fired.

When the switch 38 is closed and a pulse of energy passes through the primary winding 23, a corresponding pulse appears in the secondary windings 22 and 28 of the transformer 23 to overcome the bias provided by the constant potential sources 26 and 33. Thus, assuming no current is flowing through the primary winding 4, depending upon the direction of the pulse through the winding 37, one or the other of the thyratrons will become conductive and the ignitor connected thereto will be energized to thereby fire one of the two ignitrons in the conventional manner. However, if current is flowing through the primary winding 4, the current transformer 41 will be energized and will act through the circuitry associated therewith to energize the primary winding 4 of the transformer 25. This will energize the secondary windings 24 and 31 to provide a potential which will oppose, and in conjunction with the potential sources 26 and 33 will overcome, the potential appearing in the secondary windings 22 and 28. Thus, for so long as a material amount of current is flowing in the conductor 9, a potential will be created in the secondary windings 24 and 31 opposing that appearing in the secondary windings 22 and 28 which will thereby prevent the potential appearing in either of the secondary windings 22 or 28 from overcoming the blocking potential applied by the batteries 26 and 33 to the control electrodes of the thyratrons 17 and 18, respectively. Thus, in the case of a lagging power factor, the thyratrons 17 and 18 will not become conductive for so long as there is a current of substantial value flowing in the conductor 9 but one or the other of said thyratrons will fire as soon as such current has ceased, or substantially ceased, to flow.

Figure 3:
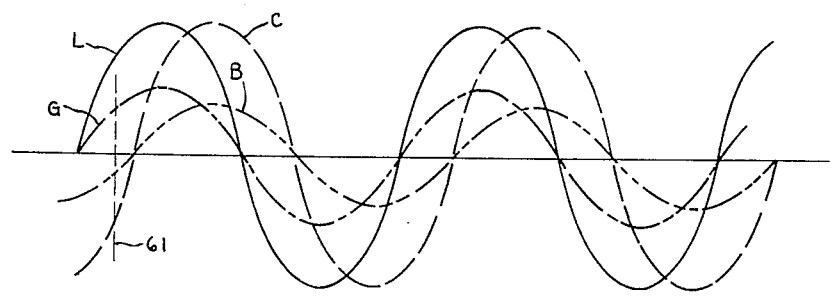
Figure 3 is a time vs. voltage current diagram illustrating the voltage current relationships resulting from the circuitry of the invention.

The diagram in Figure 3 illustrates this more fully. In Figure 3 the line L represents the A.C. line voltage. Line C represents the current flowing through the weld transformer and is shown here as lagging about 60 degrees behind the line voltage. Line C also represents the voltage out of the current transformer. Line G represents the grid voltage applied from transformer 23 to the control electrodes of the thyratrons for rendering same conductive and thereby rendering the ignitron conductive. Line B represents the blocking voltage appearing in the secondary windings 24 and 31 of the transformer 25 by which the thyratrons are held non-conductive until the current has substantially ceased to flow in a given half cycle. It will be observed that the voltage represented by line B is in phase with the current represented by line C. Thus, at the point in the cycle indicated by the line 61, the blocking voltage B is oppositely directed with respect to the grid voltage G and this blocking voltage, added to the voltage from the sources 33 and 26 of constant potential, holds the thyratrons non-conductive. However, as soon as said blocking voltage becomes zero or substantially zero, then the voltage indicated by the line G overcomes the bias voltage and the thyratron fires.

While a specific embodiment of the invention has been utilized for illustrative purposes, it will be apparent that other devices may be utilized to practice the invention, particularly the method aspects of the invention, and hence the hereinafter appended claims are to be interpreted as including such devices excepting as such claims may by their own terms expressly provide otherwise.

What is claimed is:

1. In an alternating circuit for supplying a potential to the primary winding of a welding transformer including control means and electric valve means whose operation is responsive to said control means, said control means including at least one thyratron which is normally held non-conductive and which is caused to become conductive upon the application of a potential of predetermined magnitude and polarity on its control electrode, the improvement comprising: control potential source means for creating an alternating potential in response to and in phase with the flow of alternating current through said primary winding; a blocking transformer having a primary and a secondary winding, said secondary winding being connected in circuit with the control electrode of said thyratron and said primary winding being connected to said control potential source means for energization thereby by alternating potential from said control potential source means, said secondary winding being sensed with respect to said control electrode so that energization of said blocking transformer by alternating current from said welding transformer will create on said control electrode a potential opposing conduction of the said thyratron until said alternating current in said welding transformer next reaches a predetermined level.

2. The circuit claimed in claim 1 wherein said control potential source means is a current transformer operatively associated with the primary winding of the welding transformer.

3. The circuit claimed in claim 2 including also a converting transformer connected between said current transformer and said blocking transformer, and a potentiometer connected in parallel with the primary winding of the blocking transformer whereby the magnitude of the potential imposed upon the primary winding of the blocking transformer can be adjusted as desired.

4. In an electric circuit for applying an alternating potential from an alternating potential source of the primary winding of a welding transformer, which circuit includes a pair of back-to-back connected ignitrons and a pair of thyratrons connected, respectively, to the ignitor of the respective ignitrons for controlling the conductivity thereof, bias means connected to the control electrodes of said thyratrons for normally holding same non-conductive and means connected to said control electrodes for applying an alternating potential thereto in phase with said alternating potential source to render said thyratrons conductive, the improvement in said circuit which comprises: a first current transformer connected for being energized by alternating current flowing through said primary winding of said welding transformer; a second transformer having a primary and two secondary windings, the primary winding of said second transformer being connected to said current transformer for receiving alternating voltage therefrom in phase with the current flowing through the primary winding of said welding transformer, said secondary windings of said second transformer being connected, respectively, to the control electrodes of the respective thyratrons for applying a voltage thereon opposing conduction thereof when said second transformer is energized in a selected sense whereby said thyratrons are prevented from conducting until the current flowing in said sense in the primary winding of said welding transformer become substantially zero.

5. In an electric circuit for applying a potential to the primary winding of a welding transformer, which circuit includes a pair of conductors connected to a source of A.C. potential and to said primary winding, a pair of back-to-back connected ignitrons connected in circuit with said primary winding for controlling energization thereof, a pair of thyratrons connected respectively to the ignitors of the respective ignitrons for controlling the conductivity thereof and means connected to the control electrodes of said thyratrons for applying a negative bias thereon to normally hold said thyratrons non-conductive, the improvement in said circuit which comprises: a first transformer having a primary and two secondary windings and means connecting said primary winding between said pair of conductors for energization thereby, means connecting said secondary windings, respectively, to the control electrodes of the respective thyratrons, said secondary windings supplying positive potential to said control electrodes when said first transformer is energized of sufficient value to overcome the negative bias normally maintained thereon to permit conduction thereof; a second, current, transformer connected for being energized by current flowing through said primary winding of said welding transformer; a third transformer having a primary and two secondary windings, the primary winding of said third transformer being connected to said current transformer for receiving voltage therefrom in phase with the current flowing through the primary winding of said welding transformer, said secondary windings of said third transformer being connected, respectively, to the control electrodes of the respective thyratrons for applying a negative potential thereon when said second transformer is energized in a sense opposite to the energization of said first transformer, said negative potential from said third transformer in conjunction with said negative bias applying means being sufficient to maintain said thyratrons non-conductive until the current flowing in said last-named sense in the primary winding of said welding transformer becomes substantially zero.

6. An electric circuit for controlling the flow of welding current between welding electrodes, comprising in combination: a pair of conductors connected respectively to the terminals of an A.C. source; a first, welding, transformer having a primary winding connected between said conductors; a pair of back-to-back connected ignitrons connected to one of said conductors for controlling energization of said welding transformer; a pair of thyratrons connected respectively to the ignitors of the respective ignitrons for controlling the conductivity thereof; bias means connected to the control electrodes of said thyratrons for normally holding same non-conductive; a second transformer having a primary and two secondary windings; a switch and means connecting said primary winding of said transformer in series with said switch and between said conductors, the secondary windings of said second transformer being connected respectively to the control electrodes of the respective thyratrons and being adapted to apply a positive potential thereto sufficient to overcome said bias means; a third, current, transformer associated with one of said conductors and means connected to said current transformer for providing a voltage output in phase with the flow of current through the primary winding of the welding transformer; a fourth transformer having a primary and two secondary windings, means connecting the primary winding of said fourth transformer for receiving said voltage output, said secondary windings of said fourth transformer being connected respectively to the control electrodes of the respective thyratrons for applying a negative potential thereon when current is flowing through the primary winding of said welding transformer in a sense opposite to the voltage simultaneously appearing therein, said negative potential from said fourth transformer in conjunction with said bias means being sufficient to maintain said thyratrons non-conductive until the current flowing in said last-named sense in the primary winding of said welding transformer becomes substantially zero.

7. In a circuit for supplying an alternating potential to the primary winding of a welding transformer, including control means and electric valve means whose operation is responsive to said control means, said control means including at least one thyratron which is normally held non-conductive and which is caused to become conductive upon the application of a potential of predetermined magnitude and polarity on its control electrode, the improvement comprising: means for applying to said control electrode a first alternating control potential of said predetermined magnitude and polarity in phase with said alternating potential; control source means for creating a second alternating control potential in response to and in phase with the flow of current through said primary winding; a blocking transformer having a primary and a secondary winding, said secondary winding being connected in circuit with said control electrode of said thyratron and said primary winding being connected to said control source means for energization thereby, said secondary winding being sensed with respect to said control electrode so that energization of said blocking transformer by said second alternating control potential in response to current flowing through the primary winding of said welding transformer will apply a potential overcoming said first control potential and thereby holding said thyratron non-conductive until said current in the welding transformer next diminishes to a predetermined level.

References Cited in the file of this patent
UNITED STATES PATENTS

| | | |
|---|---|---|
| 2,458,644 | Ringer et al. | Jan. 11, 1949 |
| 2,547,228 | Owens et al. | Apr. 3, 1951 |
| 2,602,155 | Michelet | July 1, 1952 |

UNITED STATES PATENT OFFICE
CERTIFICATION OF CORRECTION

Patent No. 2,961,596                            November 22, 1960

Stuart C. Rockafellow

It is hereby certified that error appears in the above numbered patent requiring correction and that the said Letters Patent should read as corrected below.

Column 5, line 5, strike out "In an alternating circuit for supplying a potential" and insert instead -- In a circuit for supplying an alternating potential --; lines 21 and 22, strike out "by alternating potential from said control potential source means," and insert instead -- so that said secondary winding applies an alternating potential to said control electrode, --; lines 24 and 25, strike out "current from said welding transformer" and insert instead -- potential from said control potential source means --; same column 5, line 41, for "of" read -- to --.

Signed and sealed this 18th day of July 1961.

(SEAL)
Attest:

ERNEST W. SWIDER
Attesting Officer

DAVID L. LADD
Commissioner of Patents